(12) United States Patent
Kumar et al.

(10) Patent No.: US 7,462,972 B2
(45) Date of Patent: Dec. 9, 2008

(54) COMMUTATOR FOR AN ELECTRIC MACHINE

(75) Inventors: Ludvik Kumar, Idrija (SI); Joze Potocnik, Idrija (SI)

(73) Assignee: Kolektor Group D.O.O., Idrija (SI)

( * ) Notice: Subject to any disclaimer, the term of this patent is extended or adjusted under 35 U.S.C. 154(b) by 392 days.

(21) Appl. No.: 10/575,335

(22) PCT Filed: Nov. 17, 2004

(86) PCT No.: PCT/EP2004/013004

§ 371 (c)(1),
(2), (4) Date: Apr. 12, 2006

(87) PCT Pub. No.: WO2005/050820

PCT Pub. Date: Jun. 2, 2005

(65) Prior Publication Data

US 2007/0114876 A1 May 24, 2007

(30) Foreign Application Priority Data

Nov. 20, 2003 (DE) ................. 103 54 220

(51) Int. Cl.
*H02K 13/10* (2006.01)
(52) U.S. Cl. .................. 310/233; 310/51; 310/236; 29/597
(58) Field of Classification Search .......... 310/51, 310/233, 236; 29/597
See application file for complete search history.

(56) References Cited

U.S. PATENT DOCUMENTS

| | | | |
|---|---|---|---|
| 5,717,270 A | 2/1998 | Lau et al. | |
| 5,796,203 A | 8/1998 | Wang | |
| 5,895,990 A | 4/1999 | Lau | |
| 6,285,106 B1 | 9/2001 | Oki | |
| 6,960,863 B2 * | 11/2005 | Potocnik et al. | 310/233 |

FOREIGN PATENT DOCUMENTS

| | | |
|---|---|---|
| DE | 2 055 648 | 5/1972 |
| DE | 36 14 869 | 11/1986 |

(Continued)

OTHER PUBLICATIONS

International Search Report dated Mar. 18, 2005.

*Primary Examiner*—Burton Mullins
(74) *Attorney, Agent, or Firm*—Katten Muchin Rosenman LLP

(57) ABSTRACT

A commutator for an electric machine comprises a support member made from insulating molding compound, a plurality of metal conductor segments (3), disposed thereon in evenly spaced manner around the commutator axis, with terminal elements disposed thereon for a rotor winding, and an interference-suppression device, to which the conductor segments are connected in electrically conductive manner. This interference-suppression device comprises a number, corresponding to the number of conductor segments (3), of individual interference-suppression elements (10') disposed around the commutator axis, and an equally large number of contact bridges (11'), each of which connects two mutually adjacent interference-suppression elements (10') to one another in electrically conductive manner, the contact bridges (11') each being provided with two inwardly directed legs (20'), which are flexible relative to one another in circumferential direction and are connected to the two associated interference-suppression elements in electrically conductive manner, and with one outwardly directed foot portion (21'), which is connected to the associated conductor segment in electrically conductive manner.

22 Claims, 5 Drawing Sheets

FOREIGN PATENT DOCUMENTS

Figure 1:
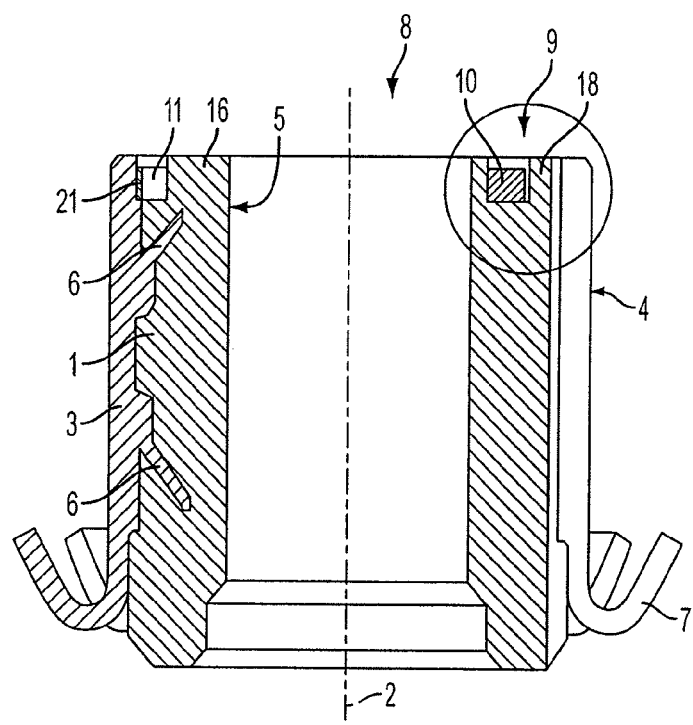

| | | |
|---|---|---|
| DE | 199 53 231 | 5/2001 |
| EP | 0 364 292 | 12/1993 |
| GB | 1 337 343 | 11/1973 |
| GB | 2 183 933 | 6/1987 |
| JP | 9-51659 | 2/1997 |

* cited by examiner

COMMUTATOR FOR AN ELECTRIC MACHINE

CROSS-REFERENCE TO RELATED APPLICATION

This application is a National Phase of PCT International Application No. PCT/EP2004/013004, filed on Nov. 17, 2004, now International Publication WO 2005/050820 and claims priority from German Patent Application 103 54 220.5 filed on Nov. 20, 2003, the contents of which are hereby incorporated by reference.

The present invention relates to a commutator for an electric machine, comprising a support member made from an insulating molding compound, a plurality of metal conductor segments disposed thereon in evenly spaced manner around the commutator axis, with terminal elements disposed thereon for a rotor winding, and an interference-suppression device, to which the conductor segments are connected in electrically conductive manner, wherein the interference-suppression device comprises a number, corresponding to the number of conductor segments, of individual interference-suppression elements disposed around the commutator axis, and an equally large number of contact bridges, each of which is connected to an associated conductor segment in electrically conductive manner and connects two mutually adjacent interference-suppression elements to one another and to the associated conductor segment in electrically conductive manner.

Commutators of various designs (drum commutators, flat commutators) are known in diverse configurations. To an increasing extent, commutators are being equipped with spark-suppression devices (interference-suppression devices), especially if they are designed as drum commutators, in order to prevent sparking at the commutator from impairing electronic assemblies disposed in physical proximity to the electric machine in question that is equipped with the commutator.

Heretofore such interference-suppression devices have often been designed as annular interference-suppression disks, which are made of a material having voltage-dependent resistance and which are connected in electrically conductive manner to the conductor segments. In such cases the corresponding interference-suppression disk can be mounted on the one hand radially outward of the brush running surface (for example, see U.S. Pat. No. 5,895,990 A, U.S. Pat. No. 5,717,270 A, GB 2183933 A and U.S. Pat. No. 5,796,203 A), or on the other hand radially inward of the brush running surface (for example, see U.S. Pat. No. 6,285,106 B1 and DE 19953231 A1). Also known are special forms of interference-suppressed drum commutators, in which the conductor segments are disposed on the outside of cylindrical interference-suppression sleeves (see DE 2055648 and DE 3614869 C2). Finally, EP 364292 B1 describes a drum commutator with a support member made of thermoplastic material, in which a heat-resistant reinforcing ring is provided radially underneath the terminal lug, which ring is provided with an interference-suppressing coating or can be disposed adjacent to a separate interference-suppression ring; in common with the separate interference-suppression ring that may be provided in addition, this reinforcing ring is mounted on a seat of the support member, where it is retained by straps protruding from the conductor segments.

Regardless of the respective specific arrangement of interference-suppression disks, the considerable costs for the interference-suppression device constitute a disadvantage in all commutators whose interference-suppression device comprises an annular interference-suppression disk, since the ceramic material from which such interference-suppression disks are usually made is very expensive; moreover, large quantities of waste are produced in the manufacture of annular interference-suppression disks, since they are cut out of a multi-layer metal-ceramic plate.

Incidentally, among the known drum commutators that are interference-suppressed by using an interference-suppression disk, only compact drum commutators with interference-suppression disks disposed radially inward of the brush running surface are feasible for many practical applications, because the space available for the respective commutator is limited. A further problem of such drum commutators with interference-suppression rings disposed radially inward of the brush running surface results from the different thermal expansion behavior of the interference-suppression disk, which is usually made of ceramic material, compared with the other components of the commutators in question. Specifically, if the thermal stresses are large enough, they can cause premature failure of commutators due to broken interference-suppression disks and/or destroyed connections between the conductor segments and the interference-suppression disks, unless special precautions are taken. As a solution to this problem, it is proposed in DE 19953231 A1 that the interference-suppression disk be joined to the support member by means of an elastic adhesive and that the conductor segments be connected to the interference-suppression disk via thin wires, which are soldered on the one hand to the terminal lug of the associated conductor segment and on the other hand to an associated metallization zone of the interference-suppression disk. In contrast, according to U.S. Pat. No. 6,285,106 B1, which discloses a drum commutator of the class in question, there are provided, for electrical contact between the conductor segments and the interference-suppression disks, leaf springs that are disposed inside an annular cavity, which is bounded by the support member, the conductor segments and an annular cover, and in which the interference-suppression disk is also housed. The leaf springs, which permit different radial thermal insulation of the interference-suppression disk on the one hand and of the other commutator components on the other hand, can be fixed in particular to the annular cover.

A particular disadvantage of the two known drum commutators, evaluated in the foregoing, each with an interference-suppression disk disposed radially inward of the conductor segments is in particular the high expense of manufacture, which is substantially due to the high manufacturing costs of the interference-suppression disk (see hereinabove) and hampers the competitiveness of the drum commutators in question.

A commutator of the type cited in the introduction, with individual interference-suppression elements, is known from Japanese Patent 9-51659 A. Between each two mutually adjacent interference-suppression elements there is clamped a contact bridge with a resilient, conductive member, this member bearing on the outside of the respective associated conductor portion with a middle portion that is slightly deformed radially inward. At the ends of the contact bridges there are provided inwardly bent-over end portions, which bear flatly on the interference-suppression elements in question.

This known commutator also suffers from the disadvantage of undesirably large dimensions.

In view of the prior art appraised in the foregoing, the problem underlying the present invention is to provide a long-lived, reliable, interference-suppressed commutator of the class in question, which commutator, in view of its suitability for mass production, can be made at low costs with little manufacturing expense. A particularly preferable object is to manufacture an interference-suppressed commutator with substantially the same dimensions as a non-interference-suppressed commutator of the same design.

This object is achieved according to the present invention by the fact that each contact bridge is provided with two inwardly directed legs, which are flexible relative to one another in circumferential direction and are connected to the two associated interference-suppression elements in electrically conductive manner, and with one outwardly directed foot portion, which is connected to the associated conductor segment in electrically conductive manner, the contact bridges being soldered or adhesively bonded in the region of their leg to the associated interference-suppression elements and in the region of their foot portions to the associated conductor segments.

A first characteristic feature of the commutator according to the present invention is therefore that the interference-suppression device comprises not an annular interference-suppression disk but instead a number of individual interference-suppression elements corresponding to the number of conductor segments; such individual interference-suppression elements, which as multi-layer capacitors can have in particular a parallelepiped shape, can be made from a multi-layer metal-ceramic plate without any kind of cutting and thus in particularly inexpensive manner. Furthermore, it is characteristic for the inventive commutator that two mutually adjacent interference-suppression elements are respectively connected to one another in electrical manner via one contact bridge each, the two legs at which the contact bridge in question is connected to the two interference-suppression elements in electrically conductive manner being designed to be flexible relative to one another in circumferential direction. In this sense, "flexible" means that the force necessary for deformation of the contact bridges in circumferential direction is smaller than the strength of the joints of the contact bridges with the interference-suppression elements. The interference-suppression device characterizing the inventive commutator is composed in this way of individual interference-suppression elements and contact bridges, which are joined together in alternating sequence to form a ring structure. The flexibility of the contact bridges then has the effect that the ring structure in question is not rigid; to the contrary, the ring structure is flexible as a whole in circumferential direction, and so it can compensate for changes of the dimensions of the commutator caused by thermal expansion. Such manufacture of the contact bridges as separate components ensures that they can be selectively matched—largely without restriction—to the described function, by the fact that the material choice and dimensions are optimized in terms of flexibility and strength of the ring structure of the interference-suppression device as well as the joint of the contact bridges with the interference-suppression elements.

The deformability of the contact bridges in their installation situation is based on the one hand on their flexible construction and on the other hand on the fact that the legs of the contact bridges are free, meaning that that they can be deformed without hindrance by adjoining components of the commutator during the normal thermal-expansion behavior of the commutator.

According to the invention, the contact bridges are permanently connected to the interference-suppression elements by means of simple soldered joints or even joints formed with electrically conductive adhesive in the region of the contact points. The situation is analogous for the connection of the contact bridges to the respective conductor segments in the region of the foot portion in question that contacts the conductor segments. In this regard, suitable metallization (such as a coating of silver or tin) of the interference-suppression elements in the region of their contact poles and/or of the contact bridges in the region of the legs may prove favorable; and in this regard it is also favorable for the contact bridges to be manufactured from copper, brass or an alloy containing these metals. Such permanent connections of the contact bridges to the interference-suppression elements and/or to the conductor segments, which are subject to only small mechanical loads due to the flexible construction of the contact bridges in the circumferential direction, as is the case for the interference-suppression elements themselves, prove to be particularly advantageous when the inventive commutator is used in a corrosive environment.

Within the scope of the present invention, it is essential that the "electrically conductive connections" of the contact bridges with the contact poles or contact faces of the respective two adjacent interference-suppression elements also be suitable for transmission of mechanical forces. Direct and indirect contacting of the contact bridges with the interference-suppression elements without having disadvantageous effects on the useful life of the commutator is achieved by the fact that the contact bridges can deform to compensate for different thermal-expansion behavior of the individual commutator components.

By application of the present invention, therefore, it is obviously possible, by virtue of the combinations of the features characteristic of inventive commutators, to manufacture extremely inexpensive, long-lived and compact interference-suppressed commutators with minimal production expense. In this regard, the present invention is applicable for various commutator designs, specifically regardless of the construction of the brush running surface. Commutators with carbon running surfaces, such as are used for operating fuel pumps for motor vehicles, can be constructed particularly advantageously according to the present invention.

According to another preferred improvement of the inventive commutator, the interference-suppression elements are designed as parallelepiped multi-layer capacitors and are disposed around the commutator axis along the edges of a regular polygon, specifically in a manner in which each is expediently located at breaks between two mutually adjacent conductor segments. This in particular favors manufacture of the inventive commutator by a method that is simple and therefore inexpensive.

Within the scope of the present invention, considerable margin for variation, which can be exploited in particular as a function of the commutator design, the dimensions and the specific requirements, is available for the structural design of the contact bridges. In this regard, a first preferred embodiment of the invention is characterized by the fact that the contact bridges are each disposed spatially between two mutually adjacent interference-suppression elements and are connected to the associated interference-suppression elements in the region of contact faces at the ends thereof. Each of these contact bridges can be made in particular of a bent metal strip, in which case the basic form of the contact bridges can then be described as substantially V-shaped.

According to another preferred improvement of the invention, it is provided that the contact bridges are disposed in a plane axially offset relative to the interference-suppression elements and are connected to the associated interference-suppression elements in the region of laterally disposed contact faces. In this case, the contact bridges, whose shape may resemble in particular a horseshoe with a foot portion attached thereto, may be made of plane metal flat stock (such as sheet), which proves to be particularly favorable in terms of costs. Such a construction of the contact bridges also has advantageous effects on the way in which commutators are manufactured according to the present invention.

Whereas the concept underlying the present invention can be advantageously adopted for commutators with different designs (drum commutators, flat commutators) and brush running surfaces of different constructions (such as those directly on metal conductor segments or those having carbon running surfaces), the advantages achievable with the present invention are particularly marked in the case that the commutator is designed as a drum commutator with a cylindrical brush running surface, since the invention permits a particularly compact design, now that the brush running surface can be extended in axial direction beyond the interference-suppression device.

As regards the construction of the terminal elements, yet another preferred improvement of the invention is characterized in that the terminal elements are designed as terminal lugs, which in the case of design of the commutator as a drum commutator are disposed in the region of the end face of the commutator opposite the interference-suppression device. In this case, the risk of damage to the connections of the contact bridges to the conductor segments as well as to the interference-suppression elements during welding of the rotor winding onto the terminal lugs is minimal.

To ensure that they will be secured in position—even during assembly —it is particularly preferable that each interference-suppression element be inserted into a support-member seat countersunk axially into the support member. To brace the interference-suppression element in question in radial direction, in circumferential direction and in axial direction, the bounding walls of such a seat are disposed opposite the radial inner and outer faces, the two end faces and one side face of the interference-suppression element. It is particularly preferable for each of these seats to be bounded in radially inward and circumferential direction by a ribbed ring and in radially outward direction by molding-compound projections of the support member.

It is to be pointed out in this regard that, at least in the case in which the contact bridges are each spatially disposed between two mutually adjacent interference-suppression elements in the manner explained hereinabove, the individual seats for the interference-suppression elements are connected to one another by installation spaces for the contact bridges, the configuration of the installation spaces being matched to the shape of the contact bridges. Although this is advantageous, it is not absolutely necessary, if the contact bridges, as also explained hereinabove, are disposed in a plane axially offset relative to the interference-suppression elements and are connected to the associated interference-suppression elements in the region of lateral, or in other words axially disposed contact faces.

As regards the manufacture of commutators according to the present invention, it is based on the method known as such and used in the relevant industry for the manufacture of a support member and of conductor segments provided with commutator blanks and embedded therein. To this extent the invention corresponds to the sufficiently known prior art, and so no further explanations are needed. In a departure from the previously employed method used for manufacture of known commutators, however, there are molded, during manufacture of the support member, seats disposed in the end faces thereof to accommodate the interference-suppression elements and if necessary installation spaces to accommodate the contact bridges connecting these seats to one another. As a rule, subsequent assembly of the individual interference-suppression elements and of the same number of contact bridges takes place in two separate, successive steps. In this sense, the prefabricated interference-suppression elements are first inserted into the said seats in the course of the further manufacturing process; thereafter the prefabricated contact bridges are attached in such a way that they each connect two mutually adjacent interference-suppression elements and one conductor segment in electrically conductive manner. For this purpose, the contact bridges can be soldered or adhesively bonded in the region of their leg to the two respective associated interference-suppression elements and in the region of the foot portion to the respective associated conductor segment.

In this regard it is favorable to apply solder or adhesive onto the contact bridges, in the region of their subsequent electrically conductive connections to the interference-suppression elements and to the conductor segments, before they are attached.

If the contact bridges are manufactured by being punched out of a plane sheet strip, as was explained hereinabove, their configuration during punching preferably corresponds to their configuration in the commutator to be manufactured. After these contact bridges have been punched out of the sheet strip, they are pressed back into it again, so that the sheet strip constitutes an assembly aid for the contact bridges. After the interference-suppression elements have been inserted into the seats, all contact bridges are transferred together onto the commutator blank, by being pressed out of the sheet strip into the installation spaces, if such are provided. In this technique, any solder or adhesive to be used is preferably applied onto the contact bridges after they have been pressed back into the sheet strips.

Figure 2:
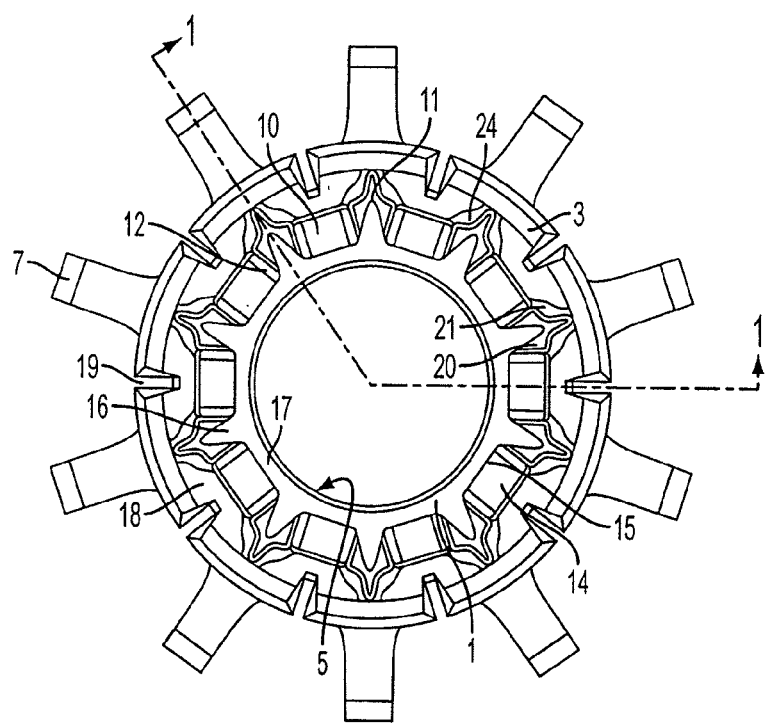
Figure 3:
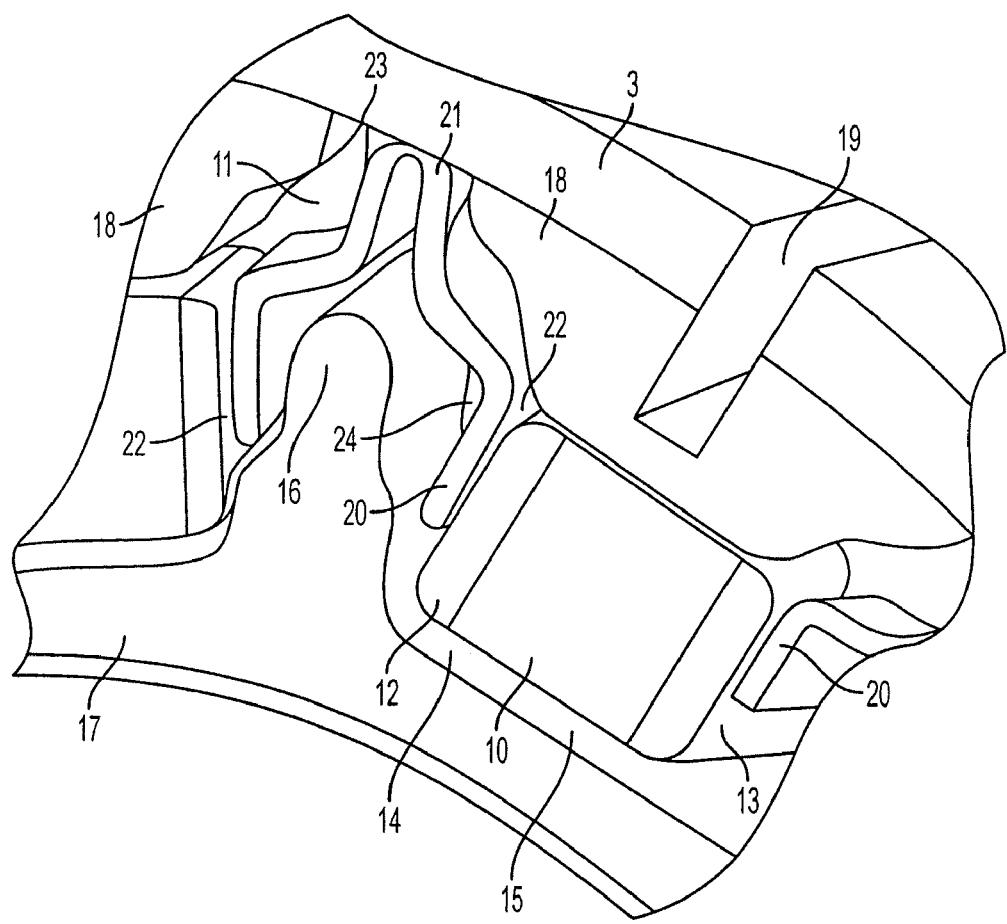
Figure 4:
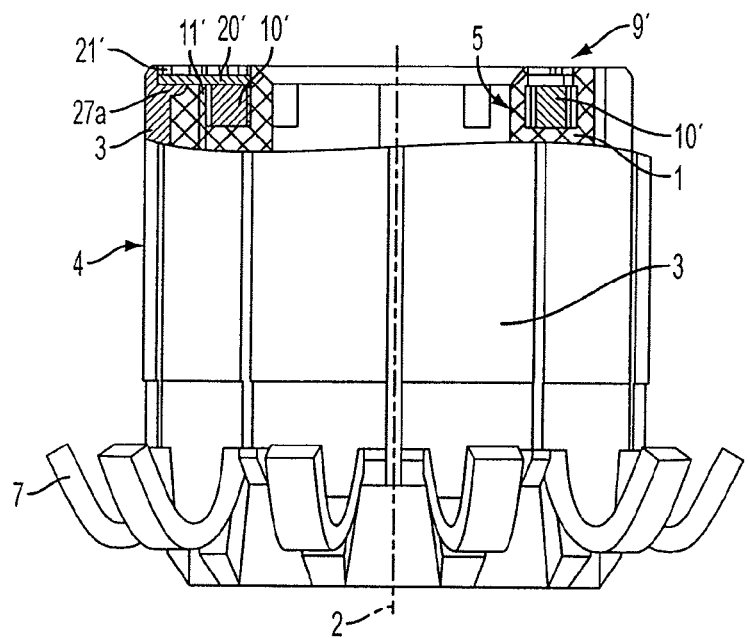
Figure 5:
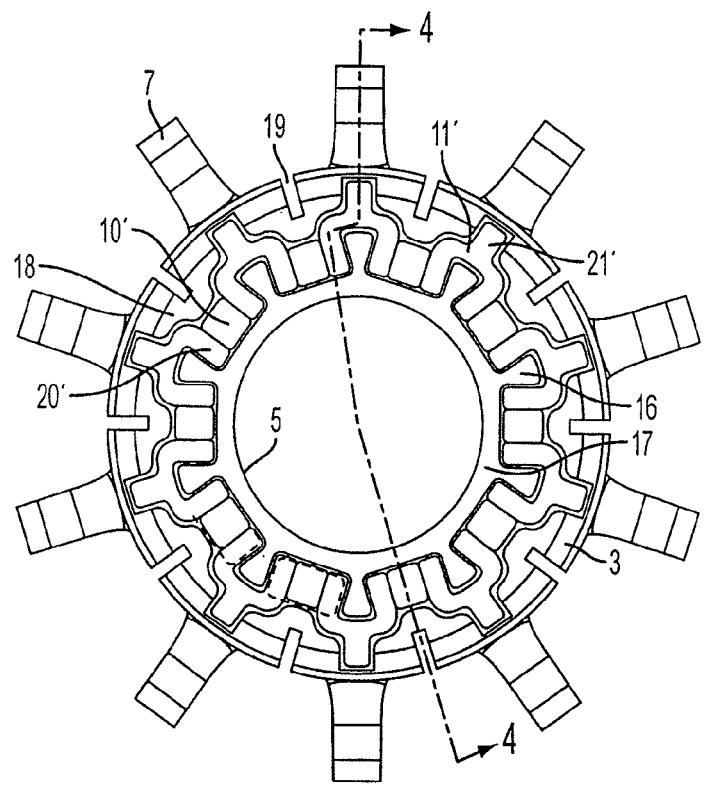
Figure 6:
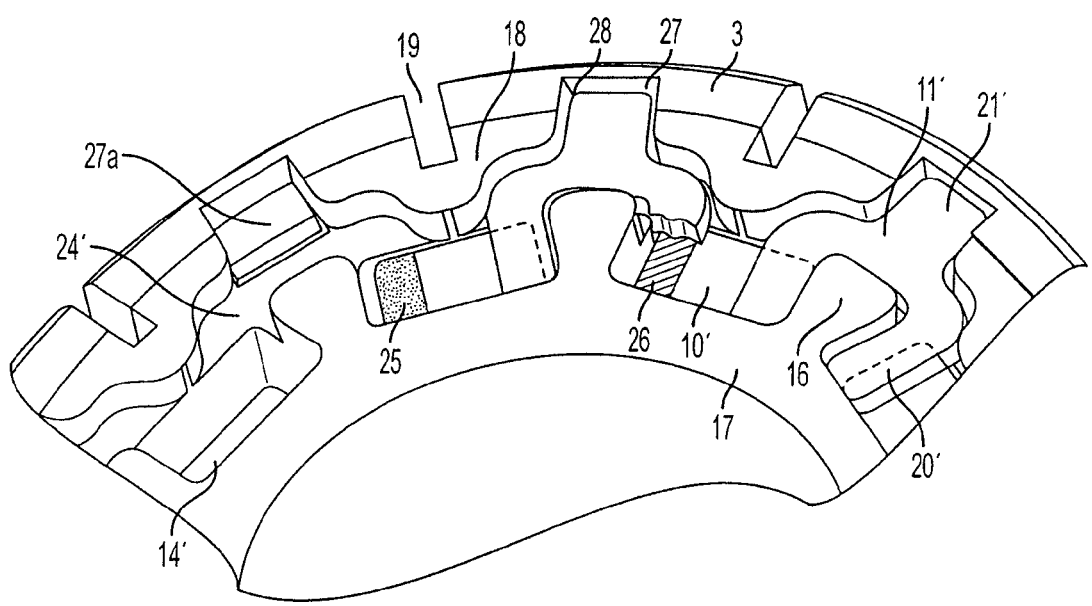
Figure 7:
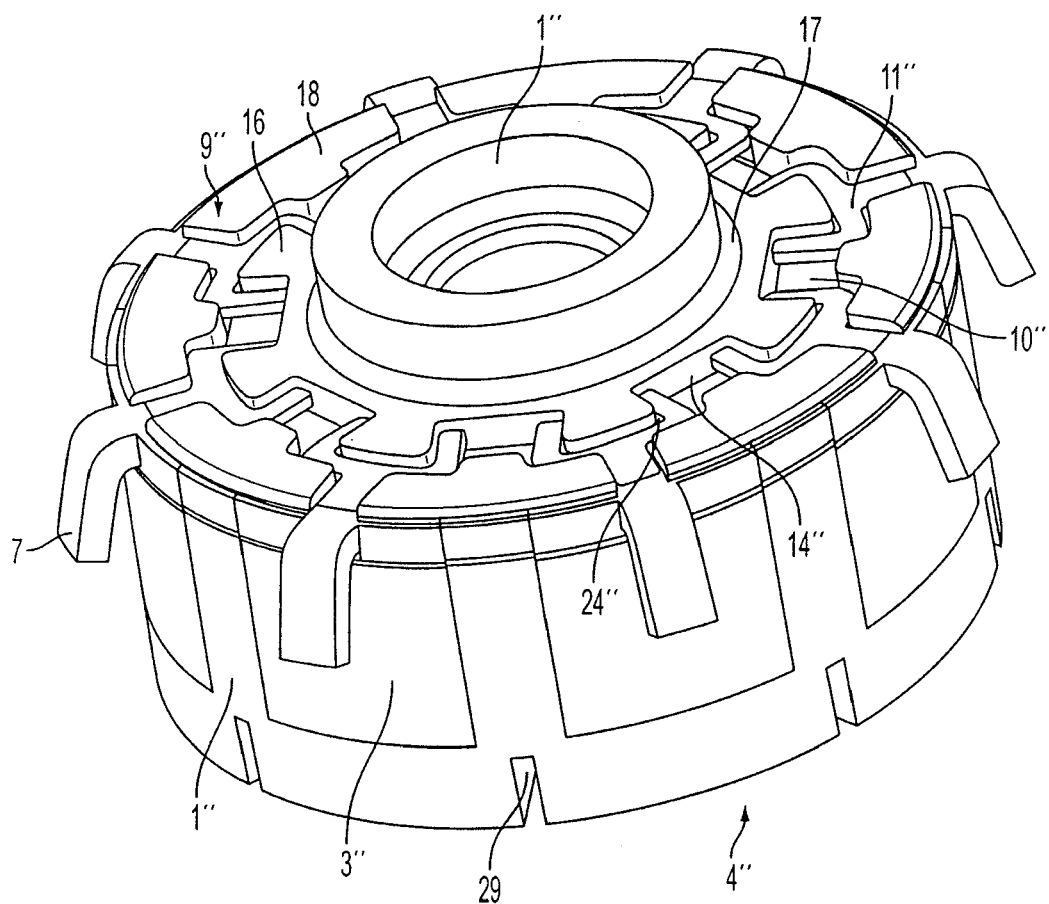

The present invention will be explained in more detail hereinafter with reference to three preferred practical examples illustrated in the drawing, wherein FIG. 1 shows an axial section through a first embodiment of a drum commutator constructed according to the present invention, FIG. 2 shows a view from above of the end of the drum commutator according to FIG. 1, FIG. 3 shows a detail, in an enlarged perspective view, of the end face shown in FIG. 1 of the drum commutator according to FIGS. 1 and 2, FIG. 4 shows an axial section through a second embodiment of a drum commutator constructed according to the present invention, FIG. 5 shows a view from above of the end of the drum commutator according to FIG. 4, FIG. 6 shows a detail, in an enlarged perspective view of the end face shown in FIG. 4 of the drum commutator according to FIGS. 4 and 5, and FIG. 7 shows a perspective view of a flat commutator constructed according to the present invention, with carbon running surface.

The drum commutator illustrated in FIGS. 1 to 3 contains as essential components a support member 1 made of insulating molding compound and ten conductor segments 3, which are disposed evenly around commutator axis 2 and whose cylindrical circumferential faces define brush running surface 4. Support member 1 is provided with a bore 5 concentric with axis 2 in order to mount the commutator on a rotor shaft (not illustrated).

Armature parts 6 of conductor segments 3 are embedded in the molding compound of support member 1 in order to anchor the conductor segments securely even at high speeds, despite the centripetal forces then occurring. At the ends of conductor segments 3 there are provided terminal lugs 7, which finction in a manner known as such as the terminals of the winding wires on the commutator.

In the scope explained in the foregoing, the commutator according to FIGS. 1 to 3 corresponds to the long-known prior art, and so no further explanations are needed for understanding in this regard.

In the region of end face 8 opposite terminal lugs 7, the commutator is provided with an interference-suppression device 9. This comprises ten individual, parallelepiped interference-suppression elements 10 of ceramic material disposed evenly around commutator axis 2, as well as ten contact bridges 11. These interference-suppression elements 10 are disposed at breaks relative to conductor segments 3. Each has a capacitor function and is provided on two mutually opposite—in the circumferential direction with respect to the installation position in the commutator—end faces with metallized films 12, which represent contact poles 13 of the interference-suppression element in question. Each interference-suppression element 10 is housed in a pocket-like seat 14 of support member 1. Each seat 14 is bounded in radially inward and circumferential direction by a circumferential face 15 and two ribs 16 of a ribbed ring 17, which is part of support member 1; in radially outward direction, molding-compound projections 18 of support member 1 bound the respective seats 14 for interference-suppression elements 10. Two conductor segments 3 bear against the outside of each molding-compound projection 18; air gaps 19, which respectively insulate two adjacent conductor segments 3 from one another, extend into molding-compound projections 18.

Contact bridges 11 are each disposed spatially between two mutually adjacent interference-suppression elements 10 and are connected to the associated interference-suppression elements in the region of end-face contact poles 13. They each comprise a metal strip, which is multiply bent to form two legs 20 and a foot portion 21 (FIG. 3). In this sense the basic form of the contact bridges can be described as substantially V-shaped. The multiple bends of contact bridges 11 means that, on the one hand, legs 21 can bear against contact poles 13 of parallelepiped interference-suppression elements 10, and that, on the other hand, elastic flexibility of the contact bridges is achieved both in circumferential direction and in radial direction. Contact bridges 11 are firmly connected to interference-suppression elements 10 via one soldered joint 22 each in the region of legs 20 and to the respective associated conductor segment 3, at the radial inner side thereof, via a soldered joint 23 in the region of foot portion 21. Seats 14 for interference-suppression elements 10 are connected to one another by installation spaces 24 for contact bridges 11, which spaces are configured such that they do not hinder free deformation of contact bridges 11.

As regards its essential geometric features, the second embodiment of the inventive commutator illustrated in FIGS. 4 to 6 corresponds to the embodiment according to FIGS. 1 to 3. In order to avoid repetitions, reference is made to the foregoing explanations.

Nevertheless, interference-suppression device 9' in the commutator according to FIGS. 4 to 6 has geometry substantially different from that in the case of the commutator according to FIGS. 1 to 3. In this case contact bridges 11' are made of plane metal flat stock; the form of contact bridges 11' corresponds approximately to that of a horseshoe forming the two legs 20', with a foot portion 21' attached thereto in the apex. Contact bridges 11' are disposed in a plane offset axially relative to parallelepiped interference-suppression elements 10', and their legs 20' bear on interference-suppression elements 10' in the respective region of metallized contact faces 25 disposed laterally thereon, or in other words in an axial plane of the commutator. There, contact bridges 11' are firmly connected to interference-suppression elements 10' via soldered joints 26. Conductor segments 3 are each provided on their inside with a slot-like recess 27, in which the associated contact bridge 11' engages with its foot portion 21'. At the inner end of recess 27 there is formed a bearing surface 27a for the associated contact bridge 11'. Contact bridges 11' and conductor segments 3 are each connected firmly to one another by means of a soldered joint 28.

In this embodiment also, seats 14' for interference-suppression elements 10' are connected to one another via installation spaces 24' for contact bridges 11', installation spaces 24' for the contact bridges having, by virtue of the axial offset of interference-suppression elements 10' and contact bridges 11', a smaller depth than seats 14' for interference-suppression elements 10'.

Expedient geometries of flat commutators designed according to the invention can also be derived directly from the practical examples illustrated in drawings and explained in the foregoing, in each case for a drum commutator. A practical example for such a flat commutator is illustrated in FIG. 7. In a manner known in itself, this flat commutator comprises a support member 1" made of molding compound and eight conductor segments 3" embedded therein. A carbon segment 29 is connected to each conductor segment 3" in electrically conductive manner, the end faces of the carbon segments defining brush running surface 4". Terminal lugs 7" are disposed on conductor segments 3" on the side of the commutator opposite brush running surface 4".

The commutator is also provided on its side opposite brush running surface 4" with an interference-suppression device 9". This comprises eight substantially parallelepiped interference-suppression elements 10" and eight contact bridges 11", each of which is connected in electrically conductive manner to the two adjacent interference-suppression elements 10" as well as to the associated conductor segment 3". Interference-suppression elements 10" are inserted into corresponding seats 14", which are molded into support member 1". Contact bridges 11" are inserted into installation spaces 24", each of which connects two adjacent seats 14" to one another, but whose depth compared with seats 14" is smaller by the thickness of interference-suppression elements 10". Incidentally, interference-suppression device 9" implemented in the flat commutator illustrated in FIG. 7 has a structure corresponding to that of the interference-suppression device of the drum commutator according to FIGS. 4 to 6. In order to avoid repetitions, reference is made to the explanations concerning that commutator. The same applies with regard to manufacture of the commutator.

The invention claimed is:

1. A commutator for an electric machine, comprising a support member (1, 1") made from insulating molding compound, a plurality of metal conductor segments (3, 3") disposed thereon in evenly spaced manner around the commutator axis (2), with terminal elements disposed thereon for a rotor winding, and an interference-suppression device (9, 9', 9"), to which the conductor segments (3, 3") are connected in electrically conductive manner, wherein the interference-suppression device (9, 9', 9") comprises a number, corresponding to the number of conductor segments (3, 3"), of individual interference- suppression elements (10, 10', 10") disposed around the commutator axis (2), and an equally large number of contact bridges (11, 11', 11"), each of which is connected to an associated conductor segment in electrically conductive manner and connects two mutually adjacent interference-suppression elements (10, 10', 10") to one another and to the associated conductor segment in electrically conductive manner, characterized in that each contact bridge (11, 11', 11") is provided with two inwardly directed legs (20, 20'), which are flexible relative to one another in circumferential direction and are connected to the two associated interference- suppression elements in electrically conductive manner, and with one outwardly directed foot portion (21, 21'), which is connected to the associated conductor segment in electrically conductive manner, the contact bridges (11, 11', 11") being soldered or adhesively bonded in the region of their leg (20, 20') to the associated interference-suppression elements (10, 10', 10") and in the region of their foot portions (21, 21', 21") to the associated conductor segments (3, 3").

2. A commutator according to claim 1, characterized in that the interference- suppression elements (10, 10', 10") are constructed as parallelepiped multi-layer capacitors.

3. A commutator according to claim 1, characterized in that the interference-suppression elements (10, 10', 10") are disposed around the commutator axis (2) in a manner equally spaced along the edges of a regular polygon.

4. A commutator according to claim 1, characterized in that each interference-suppression element (10, 10', 10") is inserted into a seat (14, 14', 14") of the support member (1, 1") that defines the location of the interference-suppression element in question in radial direction and in circumferential direction.

5. A commutator according to claim 4, characterized in that each seat (14, 14', 14") is bounded in radially inward and circumferential direction by a ribbed ring (17, 17") and in radially outward direction by molding-compound projections (18, 18") of the support member (1, 1").

6. A commutator according to claim 4, characterized in that the seats (14, 14', 14") for the interference-suppression elements (10, 10', 10") are connected to one another by installation spaces (24, 24', 24") for the contact bridges (11, 11', 11").

7. A commutator according to claim 1, characterized in that the contact bridges (11) are each disposed spatially between two mutually adjacent interference-suppression elements (10) and are connected to the associated interference- suppression elements in the region of contact poles (13) at the ends thereof.

8. A commutator according to claim 7, characterized in that the contact bridges (11) are made of a bent metal strip.

9. A commutator according to one claim 1, characterized in that the contact bridges (11', 11") are disposed in a plane axially offset relative to the interference-suppression elements (10', 10") and are connected to the associated interference- suppression elements in the region of laterally disposed contact faces (25).

10. A commutator according to claim 9, characterized in that the contact bridges (11', 11") are substantially horseshoe-shaped and are made of plane metal flat stock, in particular by being punched out of a sheet.

11. A commutator according to claim 1, characterized in that the contact bridges (11, 11', 11") are made of copper, brass or an alloy containing these metals.

12. A commutator according to claim 1, characterized in that the conductor segments (3, 3") are provided on their radial insides with recesses (27), in which the foot portions (21') of the contact bridges (11', 11") engage.

13. A commutator according to claim 1, characterized in that the contact bridges (11, 11', 11") are soldered or adhesively bonded in the region of their foot portions (21, 21', 21") to the associated conductor segments (3, 3").

14. A commutator according to claim 1, characterized in that it is constructed as a drum commutator with a cylindrical brush running surface (4).

15. A commutator according to claim 14, characterized in that the brush running surface (4) is extended in axial direction beyond the interference-suppression device (9, 9'), the radial thickness of the conductor segments (3) under the brush running surface (4) being greater than 0.5 mm even in the region of the interference-suppression device (9, 9').

16. A commutator according to claim 14, characterized in that the interference-suppression device (9, 9') is disposed at the end face of the commutator opposite the terminal elements (7) for the rotor winding.

17. A commutator according to claim 1, characterized in that it is constructed as a flat commutator with a plane brush running surface (4"), wherein the interference-suppression device (9") is disposed at the end face of the commutator remote from the brush running surface.

18. A method for manufacturing a commutator according to claim 1, comprising the following steps:
manufacturing a commutator blank, provided with the support member (1, 1") and the conductor segments (3, 3"), and having seats (14, 14', 14") disposed in the end faces of the support member to accommodate the interference-suppression elements (10, 10', 10");
manufacturing a plurality of interference-suppression elements (10, 10', 10");
manufacturing a number, corresponding to the number of interference-suppression elements, of contact bridges (11, 11', 11"), each of which is provided with two legs (20, 20') that are flexible relative to one another and with a foot portion (21, 21');
inserting the interference-suppression elements (10, 10', 10") into the seats (14, 14', 14") of the support member (1, 1");
attaching the contact bridges (11, 11', 11") in such a way that they each connect two mutually adjacent interference-suppression elements (10, 10', 10") and one conductor segment (3, 3") in electrically conductive manner, by virtue of being soldered or adhesively bonded in the region of their leg (20, 20') to the two associated interference-suppression elements (10, 10', 10") and in the region of their foot portion (21, 21') to the associated conductor segment (3, 3").

19. A method according to claim 18, characterized in that solder or adhesive is applied onto the contact bridges (11, 11', 11"), in the region of their subsequent electrically conductive connections to the interference-suppression elements (10, 10', 10") and to the conductor segments (3, 3"), before they are attached.

20. A method according to claim 18, characterized in that the contact bridges (11', 11") are manufactured by being punched out of a plane sheet strip.

21. A method according to claim 20, characterized in that the configuration of the contact bridges (11', 11") during punching corresponds to their configuration in the commutator to be manufactured, the contact bridges (11', 11") being pressed back into the sheet strip after they have been punched out of it, and are mounted together by being pressed out of the sheet strip onto the commutator blank, after the interference-suppression elements (10', 10") have been inserted into the seats (14', 14").

22. A method according to claim 21, characterized in that the solder or adhesive is applied onto the contact bridges (11, 11', 11") after they have been pressed back into the sheet strips.

* * * * *